United States Patent
Huang et al.

(10) Patent No.: US 8,270,461 B2
(45) Date of Patent: Sep. 18, 2012

(54) SIGNAL PROCESSING DEVICE AND SIGNAL PROCESSING METHOD UTILIZED IN COMMUNICATION SYSTEM

(75) Inventors: Liang-Wei Huang, Taipei (TW);
Chih-Yung Shih, Taipei (TW);
Shieh-Hsing Kuo, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 814 days.

(21) Appl. No.: 12/357,406

(22) Filed: Jan. 22, 2009

(65) Prior Publication Data
US 2009/0196335 A1    Aug. 6, 2009

(30) Foreign Application Priority Data

Jan. 31, 2008   (TW) .............................. 97103693 A

(51) Int. Cl.
*H03H 7/30* (2006.01)

(52) U.S. Cl. ...................................................... 375/229
(58) Field of Classification Search .................. 375/229, 375/230, 231, 232
See application file for complete search history.

(56) References Cited

U.S. PATENT DOCUMENTS

| | | | | |
|---|---|---|---|---|
| 6,665,337 | B1 * | 12/2003 | Girardeau et al. | 375/232 |
| 6,792,040 | B1 * | 9/2004 | Davis et al. | 375/222 |
| 7,158,566 | B2 * | 1/2007 | Dowling | 375/229 |
| 7,738,546 | B2 * | 6/2010 | Christensen | 375/232 |
| 2003/0128781 | A1 * | 7/2003 | Le-Ngoc et al. | 375/348 |
| 2005/0019042 | A1 | 1/2005 | Kaneda | |
| 2005/0186933 | A1 * | 8/2005 | Trans | 455/296 |

* cited by examiner

*Primary Examiner* — Jaison Joseph
(74) *Attorney, Agent, or Firm* — Winston Hsu; Scott Margo

(57) ABSTRACT

The present invention provides a signal processing device and a signal processing method utilized in a communication system, wherein the communication system includes at least a channel. The signal processing device includes an analog-to-digital converter (ADC), a first adding unit, a feed forward equalizing unit, a data slicing unit, a second adding unit, an infinite impulse response (IIR) compensating unit, and an interference eliminating unit. The signal processing device and the signal processing method thereof disclosed in the present invention can utilize the IIR compensating unit to solve an error distortion problem in the communication system so as to improve the whole efficiency.

12 Claims, 1 Drawing Sheet

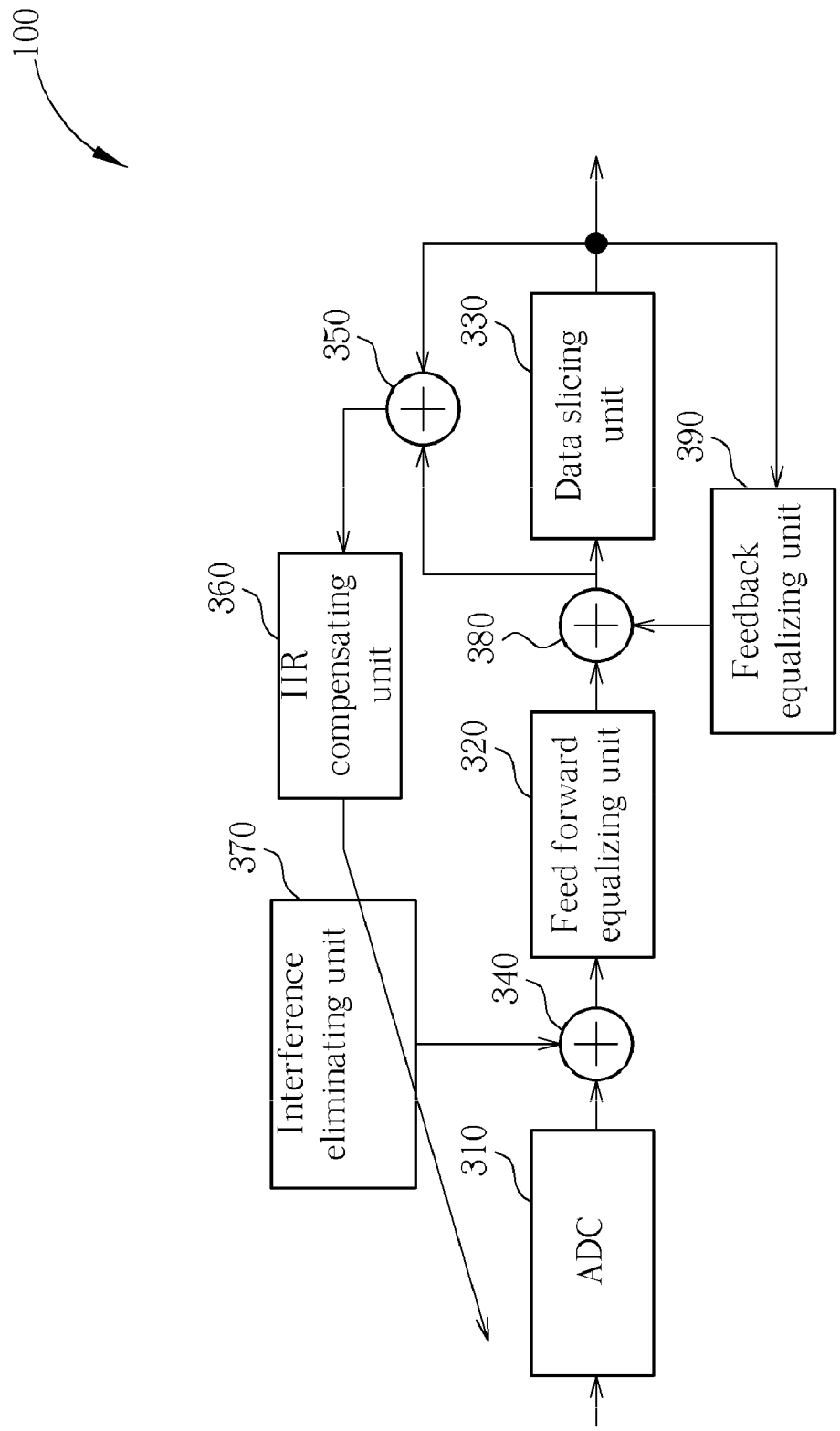

SIGNAL PROCESSING DEVICE AND SIGNAL PROCESSING METHOD UTILIZED IN COMMUNICATION SYSTEM

BACKGROUND OF THE INVENTION

1. Field of the Invention

The present invention relates to a signal processing device and a signal processing method thereof, and more particularly, to a signal processing device and a signal processing method utilized for solving error distorted problems and increasing efficiency in a communication system.

2. Description of the Prior Art

In general, in a wire transmitting communication system (such as a 10G Base-T system, a Giga Ethernet system, or a 10/100 Ethernet system), since signals decay when passing through channels in the wire transmitting communication system, a feed forward equalizer (FFE) or a decision feedback equalizer (DFE) comprising an FFE and a feedback equalizer (FBE) is required to eliminate the channel effect.

SUMMARY OF THE INVENTION

It is therefore one of the objectives of the present invention to provide a signal processing device and a signal processing method utilized for solving error distorted problems and increasing efficiency in a communication system.

In accordance with an embodiment of the present invention, a signal processing device utilized in a communication system is disclosed, wherein the communication system comprises at least a channel. The signal processing device comprises an analog-to-digital converter (ADC), a first adding unit, a feed forward equalizing unit, a data slicing unit, a second adding unit, an infinite impulse response (IIR) compensating unit, and an interference eliminating unit. The ADC is coupled to the channel, and utilized for performing an analog-to-digital converting operation on an analog input signal of the channel to generate the digital input signal. The first adding unit is coupled to the ADC, and utilized for generating a first output signal according to the digital input signal and an interference eliminating signal. The feed forward equalizing unit is coupled to the first adding unit, and utilized for compensating the first output signal to generate an equalized signal. The data slicing unit is coupled to the feed forward equalizing unit, and utilized for generating a second output signal according to the equalized signal. The second adding unit is coupled between the feed forward equalizing unit and the data slicing unit, and utilized for generating a third output signal according to the equalized signal and the second output signal. The IIR compensating unit is coupled to the second adding unit, and utilized for performing a compensation operation according to the third output signal so as to generate a fourth output signal. The interference eliminating module is coupled between the first adding unit and the IIR compensating unit, and utilized for generating the interference eliminating signal according to the fourth output signal.

In accordance with an embodiment of the present invention, a signal processing method utilized in a communication system is disclosed, wherein the communication system comprises at least a channel. The signal processing method comprises: performing an analog-to-digital converting operation on an analog input signal of the channel to generate a digital input signal; generating a first output signal according to the digital input signal and an interference eliminating signal; compensating the first output signal to generate an equalized signal; generating a second output signal according to the equalized signal; generating a third output signal according to the equalized signal and the second output signal; performing a compensation operation according to the third output signal so as to generate a fourth output signal; and generating the interference eliminating signal according to the fourth output signal.

Briefly summarized, the signal processing device and the signal processing method thereof disclosed by the present invention can utilize an IIR compensating unit to solve the error distorted problems and increase efficiency in a communication system.

These and other objectives of the present invention will no doubt become obvious to those of ordinary skill in the art after reading the following detailed description of the embodiment that is illustrated in the various figures and drawings.

BRIEF DESCRIPTION OF THE DRAWINGS

The FIGURE shows a simplified block diagram of a signal processing device 100 in accordance with an embodiment of the present invention.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The present invention relates to a signal processing device and a signal processing method thereof, which can be implemented in a communication system, and this document will describe several exemplary embodiments that apply the signal processing device and the signal processing method of the present invention. However, a person of average skill in the pertinent art should understand that the signal processing device and the signal processing method of the present invention can be applied to other similar types of communication systems and are not limited to the particular embodiments described in the following paragraphs or to the particular circuit schemes in which any features of such embodiments are implemented.

In general, the signal processing device and the signal processing method thereof of the present invention can be applied to all kinds of communication systems. A signal processing device and a signal processing method thereof applied to a 10G Base-T system, a Giga Ethernet system, or a 10/100 Ethernet system are disclosed in this document. However, this is only for illustrative purposes and is not meant to be a limitation of the present invention. In addition, under conditions of not affecting the technical disclosure of the present invention, the communication system comprising the 10G Base-T system, the Giga Ethernet system, or the 10/100 Ethernet system will be used in this document as an example to illustrate the detailed scheme and the operation principles of the signal processing device and the signal processing method thereof in accordance with the present invention.

Please refer to the FIGURE. The FIGURE shows a simplified block diagram of a signal processing device 100 in accordance with an embodiment of the present invention, wherein the signal processing device 100 is utilized in a communication system (not shown), and the communication system comprises a plurality of channels (not shown). As shown in the FIGURE, the signal processing device 100 comprises an analog-to-digital converter (ADC) 310, a feed forward equalizing unit 320, a data slicing unit 330, a first adding unit 340, a second adding unit 350, an infinite impulse response (IIR) compensating unit 360, an interference eliminating unit 370, a third adding unit 380, and a feedback equalizing unit 390. The ADC 210 is coupled to one of the plurality of channels (not shown), and utilized for performing an analog-to-digital converting operation on an analog input signal (not shown) of the channel to generate a digital input signal (not shown). The first adding unit is 340 coupled to the ADC 310, and utilized for generating a first output signal (not shown) according to the digital input signal and an interference eliminating signal (not shown). The feed forward equalizing unit 320 is coupled to the first adding unit 340, and utilized for compensating the first output signal to generate an equalized signal (not shown). The third adding unit 380 is coupled to the feed forward equalizing unit 320, the feedback equalizing unit 390, the second adding unit 350, and the data slicing unit 330. The feedback equalizing unit 390 is coupled between the third adding unit 380 and the data slicing unit 330, and utilized for generating a feedback equalizing signal (not shown) to the third adding unit 380 according to a second output signal (not shown). The third adding unit 380 generates a fifth output signal according to the equalized signal and the feedback equalized signal. The data slicing unit 330 is utilized for generating the second output signal to the feedback equalizing unit 390 and the second adding unit 350 according to the fifth output signal. The second adding unit 350 is coupled to the third adding unit 380, the IIR compensating unit 360, and the data slicing unit 330, and utilized for generating a third output signal (not shown) to the IIR compensating unit 360 according to the fifth output signal and the second output signal. The IIR compensating unit 360 is coupled to the second adding unit 350, and utilized for performing a compensation operation according to the third output signal so as to generate a fourth output signal (not shown). The interference eliminating module 370 is coupled between the first adding unit 340 and the IIR compensating unit 360, and utilized for generating the interference eliminating signal according to the fourth output signal. Please note that the interference eliminating module 370 comprises an echo canceller (not shown) and a plurality of near end crosstalk (NEXT) cancellers (not shown), wherein the echo canceller is utilized for eliminating interference of the channel, and the plurality of near end crosstalk (NEXT) cancellers are utilized for eliminating interference from the other channels of the plurality of channels. However, please note that the above embodiment is only for an illustrative purpose and is not meant to be a limitation of the present invention. For example, the feedback equalizing unit 390 and the third adding unit 380 are not essential elements of the signal processing device 100 in the present invention, and thus the feedback equalizing unit 390 and the third adding unit 380 can be selectively omitted under a specific condition.

In addition, the concept of the compensation operation performed by the IIR compensating unit 360 is illustrated as follows. In an embodiment, presume that an error generated by the interference eliminating module 370 is err, and a parameter of the feed forward equalizing unit 320 is f, then the error will become (err*f) after passing through the feed forward equalizing unit 320. Thus, the simplest compensation operation is setting a compensation parameter of the IIR compensating unit 360 to be 1/f, so as to let the error become the original err again after the compensation operation performed by the IIR compensating unit 360 (i.e., (err*f)*1/f=err). In addition, a compensation parameter of the IIR compensating unit 360 is adjusted according to parameters on right side of a main tap of the feed forward equalizing unit 320 in order to ensure that all the Pole/Zero be inside the unit circle, and the signals will not diverge after passing through the IIR compensating unit 360. In this way, although a part of distortion is not compensated actually (since parameters on left side of the main tap are not compensated, and the parameters on left side of the main tap is changed according to settings of the feed forward equalizing unit 320), the present invention still can reduce the effect of not compensating the parameters on left side of the main tap by decreasing loadings of the feed forward equalizing unit 320 and increasing loadings of the feedback equalizing unit 390. In addition, please note that the above embodiment is only for an illustrative purpose and is not meant to be a limitation of the present invention.

Briefly summarized, the signal processing device and the signal processing method thereof disclosed by the present invention can utilize an IIR compensating unit to solve the error distorted problems and increase efficiency in a communication system.

Those skilled in the art will readily observe that numerous modifications and alterations of the device and method may be made while retaining the teachings of the invention.

What is claimed is:

1. A signal processing device utilized in a communication system, the communication system comprising at least a channel, the signal processing device comprising:
   an analog-to-digital converter (ADC), coupled to the channel, for performing an analog-to-digital converting operation on an analog input signal of the channel to generate a digital input signal;
   a first adding unit, coupled to the ADC, for generating a first output signal according to the digital input signal and an interference eliminating signal;
   a feed forward equalizing unit, coupled to the first adding unit, for compensating the first output signal to generate an equalized signal
   a data slicing unit, coupled to the feed forward equalizing unit, for generating a second output signal according to the equalized signal;
   a second adding unit, coupled between the feed forward equalizing unit and the data slicing unit, for generating a third output signal according to the equalized signal and the second output signal;
   an infinite impulse response (IIR) compensating unit, coupled to the second adding unit and having a compensation parameter, for performing a compensation operation by multiplying the third output signal by the compensation parameter so as to generate a fourth output signal; and
   an interference eliminating module, coupled between the first adding unit and the IIR compensating unit, for generating the interference eliminating signal according to the fourth output signal.

2. The signal processing device of claim 1, further comprising:
   a third adding unit, coupled between the feed forward equalizing unit and the data slicing unit; and
   a feedback equalizing unit, coupled between the third adding unit and the data slicing unit, for generating a feedback equalizing signal to the third adding unit according to the second output signal;

wherein the third adding unit generates a fifth output signal to the data slicing unit and the second adding unit according to the equalized signal and the feedback equalized signal, the data slicing unit generates the second output signal to the feedback equalizing unit and the second adding unit according to the fifth output signal, and the second adding unit generates the third output signal to the IIR compensating unit according to the fifth output signal and the second output signal.

3. The signal processing device of claim 1, wherein the compensation parameter of the IIR compensating unit is adjusted according to loadings of the feed forward equalizing unit and the feedback equalizing unit.

4. The signal processing device of claim 1, wherein the communication system comprises a plurality of channels, and the interference eliminating module comprises:

an echo canceller, for eliminating interference of the channel; and at least a near end crosstalk (NEXT) canceller, for eliminating interference from the other channels.

5. The signal processing device of claim 1, wherein the communication system comprises a 10G Base-T system, a Giga Ethernet system, or a 10/100 Ethernet system.

6. The signal processing device of claim 1, wherein the compensation parameter of the IIR compensating unit is adjusted according to parameters on right side of a main tap of the feed forward equalizing unit.

7. A signal processing method utilized in a communication system, the communication system comprising at least a channel, the signal processing method comprising:

performing an analog-to-digital converting operation on an analog input signal of the channel to generate a digital input signal;

generating a first output signal according to the digital input signal and an interference eliminating signal;

compensating the first output signal to generate an equalized signal;

generating a second output signal according to the equalized signal;

generating a third output signal according to the equalized signal and the second output signal;

performing a compensation operation by multiplying the third output signal by the compensation parameter so as to generate a fourth output signal; and generating the interference eliminating signal according to the fourth output signal.

8. The signal processing method of claim 7, further comprising:

generating a feedback equalizing signal according to the second output signal;

generating a fifth output signal according to the equalized signal and the feedback equalized signal;

generating the second output signal according to the fifth output signal; and generating the third output signal according to the fifth output signal and the second output signal.

9. The signal processing method of claim 7, further comprising:

adjusting the compensation parameter.

10. The signal processing method of claim 7, wherein the communication system comprises a plurality of channels, and the signal processing method further comprising:

eliminating interference of the channel; and eliminating interference from the other channels.

11. The signal processing method of claim 7, wherein the communication system comprises a 10G Base-T system, a Giga Ethernet system, or a 10/100 Ethernet system.

12. The signal processing method of claim 7, further comprising:

adjusting the compensation parameter according to parameters on right side of a main tap.

* * * * *